US011498693B1

(12) United States Patent
Cysewski (10) Patent No.: US 11,498,693 B1
(45) Date of Patent: Nov. 15, 2022

(54) DECORATIVE DISPLAY PANELS FOR INTERIORS

(71) Applicant: The Boeing Company, Chicago, IL (US)

(72) Inventor: Sean R. Cysewski, Chicago, IL (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 17/383,183

(22) Filed: Jul. 22, 2021

(51) Int. Cl.
| | |
|---|---|
| *B64D 43/00* | (2006.01) |
| *F21V 3/00* | (2015.01) |
| *F21V 15/01* | (2006.01) |
| *B64D 47/02* | (2006.01) |
| *F21V 17/12* | (2006.01) |
| *F21Y 115/10* | (2016.01) |

(52) U.S. Cl.
CPC .............. *B64D 43/00* (2013.01); *B64D 47/02* (2013.01); *F21V 3/00* (2013.01); *F21V 15/01* (2013.01); *F21V 17/12* (2013.01); *B64D 2203/00* (2013.01); *F21Y 2115/10* (2016.08)

(58) Field of Classification Search
CPC .......... B60Q 3/43–46; B64D 47/00–02; B64D 2011/0038; B64D 2011/0053; B64D 2203/00; F21V 3/00; F21V 15/00–01; F21V 17/12; F21W 2107/30; F21Y 2115/10
See application file for complete search history.

(56) References Cited

U.S. PATENT DOCUMENTS

| | | | | |
|---|---|---|---|---|
| 7,576,976 | B2 * | 8/2009 | Kawano ............ | G02F 1/133308 361/679.21 |
| 7,712,933 | B2 * | 5/2010 | Fleischmann ......... | G02B 6/006 362/495 |
| 9,201,452 | B2 * | 12/2015 | Qi ........................ | G06F 1/1601 |
| 10,222,029 | B2 * | 3/2019 | Camp, III .............. | F21V 5/048 |
| 10,759,332 | B2 * | 9/2020 | Stossel .................... | G09F 21/04 |

* cited by examiner

*Primary Examiner* — Jason M Han
(74) *Attorney, Agent, or Firm* — McDonnell Boehnen Hulbert & Berghoff LLP (57) ABSTRACT

Example implementations relate to decorative display panels for aircraft interiors. An example display panel can include a display shell having one or more openings arranged to form a decorative design and a translucent layer coupled to the display shell. The translucent layer can extend across the openings in the display shell. The display panel can also include a lighting interface coupled to the translucent layer and configured to illuminate one or more portions of the translucent layer positioned relative to the openings in the display shell. The display shell may be coupled to the interior panel such that the translucent layer and the light interface are positioned in between the display shell and the interior panel from an aircraft. In some examples, the lighting interface can illuminate the display panel using different colors and patterns based on desired visual effect and/or operational status of the aircraft.

20 Claims, 8 Drawing Sheets

DECORATIVE DISPLAY PANELS FOR INTERIORS

FIELD

The present disclosure relates generally to attachable display and lighting features for interior panels, and more particularly to, examples for decorative display panel interfaces for internal installation in aircrafts and other types of vehicles.

BACKGROUND

Aircraft and other types of vehicles often include interior panels that can be used to cover structural, mechanical, and electric components. For instance, an aircraft cabin can include interior panels that cover mechanical and electric components positioned near passenger windows, interior door panels, stowage bin panels, ceiling panels, and interior wall panels. In some applications, interior panels may be made of plastic materials designed to meet Federal Aviation Administration (FAA) requirements for flame and heat release.

SUMMARY

In one example, a display panel is described. The display panel includes a display shell having one or more openings arranged to form a decorative design and a translucent layer. A first surface of the translucent layer is coupled to the display shell and the translucent layer extends across the one or more openings. The display panel also includes a lighting interface coupled to a second surface of the translucent layer. The lighting interface is configured to illuminate one or more portions of the translucent layer positioned relative to the one or more openings in the display shell. The display panel further includes an interior panel. The display shell is coupled to the interior panel such that the translucent layer and the lighting interface are positioned in between the display shell and the interior panel.

In another example, a system is described. The system includes a first display panel, which includes a first display shell having one or more openings arranged to form a first portion of a decorative design, a translucent layer where a first surface of the translucent layer is coupled to the first display shell and the translucent layer extends across the one or more openings. The first display shell also includes a lighting interface coupled to a second surface of the translucent layer where the lighting interface is configured to illuminate one or more portions of the translucent layer positioned relative to the one or more openings in the first display shell. The first display shell further includes an interior panel, where the first display shell is coupled to the interior panel such that the translucent layer and the lighting interface are positioned in between the first display shell and the interior panel. The system also includes a second display panel positioned proximate the first display panel.

In a further example, a method is described. The method involves generating a display shell having one or more openings arranged to form a decorative design and coupling a first surface of a translucent layer to the display shell such that the translucent layer extends across the one or more openings. The method further involves coupling a lighting interface to a second surface of the translucent layer. The lighting interface is configured to illuminate one or more portions of the translucent layer positioned relative to the one or more openings in the display shell. The method also involves coupling the display shell to an interior panel such that the translucent layer and the lighting interface are positioned in between the display shell and the interior panel.

The features, functions, and advantages that have been discussed can be achieved independently in various examples or may be combined in yet other examples further details of which can be seen with reference to the following description and drawings.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying drawings, wherein:

DETAILED DESCRIPTION

Disclosed examples will now be described more fully hereinafter with reference to the accompanying drawings, in which some, but not all of the disclosed examples are shown. Indeed, several different examples may be described and should not be construed as limited to the examples set forth herein. Rather, these examples are described so that this disclosure will be thorough and complete and will fully convey the scope of the disclosure to those skilled in the art.

Aircraft and other types of vehicles are often manufactured in a standardized process that can help keep overall costs low. The standard manufacturing process can involve producing interior panels and other features in a generic and uniform manner for each vehicle (e.g., aircraft) regardless of the customers purchasing and using the vehicle. As an example result, airlines and other companies (or other types of owners) that operate fleets of vehicles might desire ways to enhance the internal appearance of vehicles for passengers in order to differentiate their vehicles from the vehicles operated by other companies.

Example implementations presented herein relate to decorative display panels that can enhance the appearance of interiors of aircrafts and other types of vehicles. By implementing one or more example decorative display panels, a vehicle's interior can be customized in a way that augments the aesthetics of the vehicle and the experience for passengers. In addition, disclosed decorative panel generation techniques can be used to visually upgrade existing interior panels from various sources, such as aircraft, vehicles, and/or buildings. Such decorative displays may be placed in high-traffic areas for maximum viewing, especially in the case of display panels used to advertise or promote a certain brand.

Generation of example display panels can be performed using a variety of techniques and according to various parameters. As an example result, display panels can be customized in numerous ways, including in the design, colors, shape, size, materials, and/or style. This production flexibility allows for panels in various shapes and sizes to be visually enhanced via the application of a decorative design or designs. In addition, individual display panels can be formed to have surface areas and curvatures that align with the underlying interior panel that is undergoing a visual modification (or being replaced altogether). This way, example display panels can be installed within aircraft or other vehicles without requiring any rearrangement of interior components thereby reducing overall installation time of each display panel. Further, in some instances, an example display panel may be installed on a moving interior panel (e.g., a stowage bin and door exterior), which may involve shaping the display panel to match the existing interior panel to avoid impacting the range of movement during use. Thus, because example display panels can be shaped and configured in a variety of ways, example techniques can be performed to generate decorative display panels for various panels inside an aircraft, bus, ship, train, subway, vehicle, and/or other types of surfaces (e.g., panels within malls, buildings, and other structures).

In some applications, example display panels can be generated to convey decorative designs that represent or relate to company logos, shapes, mascots, objects, landscapes, and/or elements. By way of an example, an airline may incorporate decorative panels in aircraft cabins to visually distinguish their aircraft from competitors. For instance, the display panels may present colors, logos, and designs associated with the airline that help differentiate the internal appearance of their aircrafts relative to other airlines. In some cases, display panels can be used to decorate interiors of aircrafts based on the routes that each aircraft typically travels. For example, landmarks, landscapes, and other types of decorative elements associated with routes that the aircraft typically travels can be implemented on display panels to visually customize the interior appearance with colors, patterns, and scenery to the walls, ceilings, and/or other interior portions of the aircraft.

In some example implementations, display panels can individually include decorations that collectively form a larger overall display (e.g., a mural). For instance, multiple display panels can form pictures, designs, and/or other types of visual enhancements that span across the ceiling, walls, doors, stowage bins, and/or other interior portions of an aircraft. In some instances, some elements within the larger overall display may be added to surfaces within the aircraft (or other type of vehicle) in ways that differ from the example display panels presented herein. For instance, some elements within a visual display in the interior of an aircraft can include stickers, paint, and/or other types of visual enhancements.

In some examples, a display panel can include multiple layers. As an example, a display panel can include a decorative shell that includes the external visual enhancements intended to be seen by passengers. As such, the decorative shell can serve as the outermost layer for the display panel. In some instances, the decorative shell can be designed with one or more openings arranged to form a decorative design (or part of a larger decorative design). For example, holes or specific designs can be shaped into the decorative shell and arranged in a way that forms desired logos, words, numbers, phrases, animals, landscapes, shapes, and/or other designs.

In some cases, the decorative shell can include visual effects, such as elements painted onto the shell, different features shaped into the decorative shell, and/or other visual modifications. For instance, different shapes can be formed into the decorative shell layer to produce a three dimensional (3D) design. The decorative shell layer can also be curved and shaped in a way that also creates a visual 3D effect. In addition, the decorative design, color, shape, and/or configuration of the display shell can vary depending on the intended use for the display panel. In some applications, the display shell can include a combination of visual effects that can enhance the appearance of the display panel overall, such as different materials, colors, shapes, openings, and/or other visual elements.

The decorative display shell can be coupled directly to an interior panel to form a display panel in some examples. For instance, fasteners and/or adhesives can be used to connect the display shell to the interior panel, which may be an interior ceiling or dome panel, a door panel, a window panel, a wall panel, or another type of panel. In some examples, the display shell can be connected with a gap relative to portions of the interior panel. For instance, the fasteners may cause some space to be maintained the display shell and the interior panel. In other examples, the display shell can be constructed to replace the interior panel.

In some example implementations, the display shell may be part of a display panel that also includes a translucent layer. For instance, the translucent layer can be coupled to a back surface of the decorative shell that is opposite the external surface that is displayed when the display panel is installed. The translucent layer can add a visual effect to openings in the display shell and may also enhance the durability of the display panel by serving as an additional layer of support. In some examples, the translucent layer may be a translucent plastic film, a thermoformed plastic sheet, and/or other types of translucent materials. As such, the display shell may be coupled to an interior panel with the translucent layer positioned in between.

Some example display panels also include a lighting interface that can be configured to provide illumination to enhance the appearance of aspects of the display panel. For example, illumination from the lighting interface can help draw focus towards a logo or another portion of the display shell. The lighting interface may be used to illuminate portions of the translucent layer, which can result in the openings in the decorative design appearing to be illuminated as well. For instance, the lighting interface can be connected in between the translucent layer and the interior panel, which allows for different lighting aspects to be used with the display panel (e.g., openings, gaps, and/or ambient lighting).

The lighting interface can be configured to provide illumination in various color ranges, degrees of brightness, patterns, etc., which can contribute to the aesthetic appeal of the display panel. For instance, the lighting interface can provide illumination in colors that enhance the design of the display panel, which may include ambient lighting around aspects of the display panel. In some examples, the lighting interface can receive power from a power source of the vehicle. For instance, the power wire can extend to the power source through an opening in a side-end of the interior panel and connect to an existing aircraft (or other type of vehicle) power source. This can prevent unwanted tampering by passengers as well as prevent the power wire from reducing from the aesthetic appeal of the display panel.

In some examples, the display shell is connected to the interior panel with the translucent layer and the lighting interface positioned in between the display shell and the interior panel. In some cases, the interior panel can be from aircraft or another type of vehicle. For instance, the interior panel can be the original part included within the interior of the vehicle (or building) that is incorporating the display panel for visual enhancement. Some example display panels may be used for exterior enhancement of a vehicle or another type of structure (e.g., a building).

Multiple display panels can be combined to form a stack in some examples. For instance, display panels can be attached to each other via one or more fasteners, such as one or more screws going through the next closet display panel. Directly connecting multiple panels can boost strength and help maintain alignment during installation and operation of the vehicle (e.g., during aircraft operations). In some examples, a subset of layers of display panels may be coupled together. For instance, the display shells for multiple neighboring display panels can be coupled together using fasteners.

In some examples, the design and appearance of the display panel can depend on the manufacturing techniques used to generate the display panel. In some applications, components making up a display panel may involve composites fabricated using presses and/or hand layup. Display panels may also include metals (e.g., aluminum and/or steel) fabricated using super-forming. The materials may be selected based on properties that enable the materials to endure a variety of temperatures experienced by aircrafts and/or the weight of the materials. Lighter materials may be selected for implementation as display panels within aircrafts.

In other examples, the display shell and/or other components of example display panels can be generated using an injection molding process, which is a manufacturing process for producing parts by injecting molten material into a mold. A variety of molten materials can be used to form the panel portion, such as metals, glasses, elastomers, confections, and thermoplastic and thermosetting polymers. In some examples, the material used for display shell and/or other components can depend on the type of vehicle that display panel is intended for. For example, a thermoplastic or polymer might be used for display panels produced for use within aircrafts. The materials utilized can be configured to pass fire and other tests that can be associated with implementing internal panels within an aircraft.

In an example implementation, the injection molding process can involve generating a display shell with a surface area that aligns with the surface area of the interior panel. The display shell can then be further modified to form the particular design for the panel portion using a shaping process (e.g., a water jetting process). The display shell can be cut or shaped to form a design, such as a logo, city skyline, graphical design, etc. In further examples, the display shell portion can be generated at a smaller size to fit only a portion of the interior panel. In these examples, generating the display shell in a smaller initial size before shaping the display shell for the interior panel can reduce the amount of materials used.

Components within a display panel can be coupled together via various techniques within example implementations. For instance, display panel components can be coupled together via adhesives and/or mechanical fasteners. For example, a set of machine screws can be used to position and secure display panel components against the exterior of the interior panel. As such, the quantity, type, and configuration of the fasteners can vary within examples.

In addition, in some applications, coupling together components may involve forming one or more gaps between layers within a display panel and/or gaps between portions of layers. The gaps may exist due to differences in the curvature of the display shell relative to the interior panel and/or to add visual effects via lighting that fills the gaps as ambient lighting. The gaps can help create a layered 3D appearance that helps differentiate from the 2D interior panel.

Figure 1:
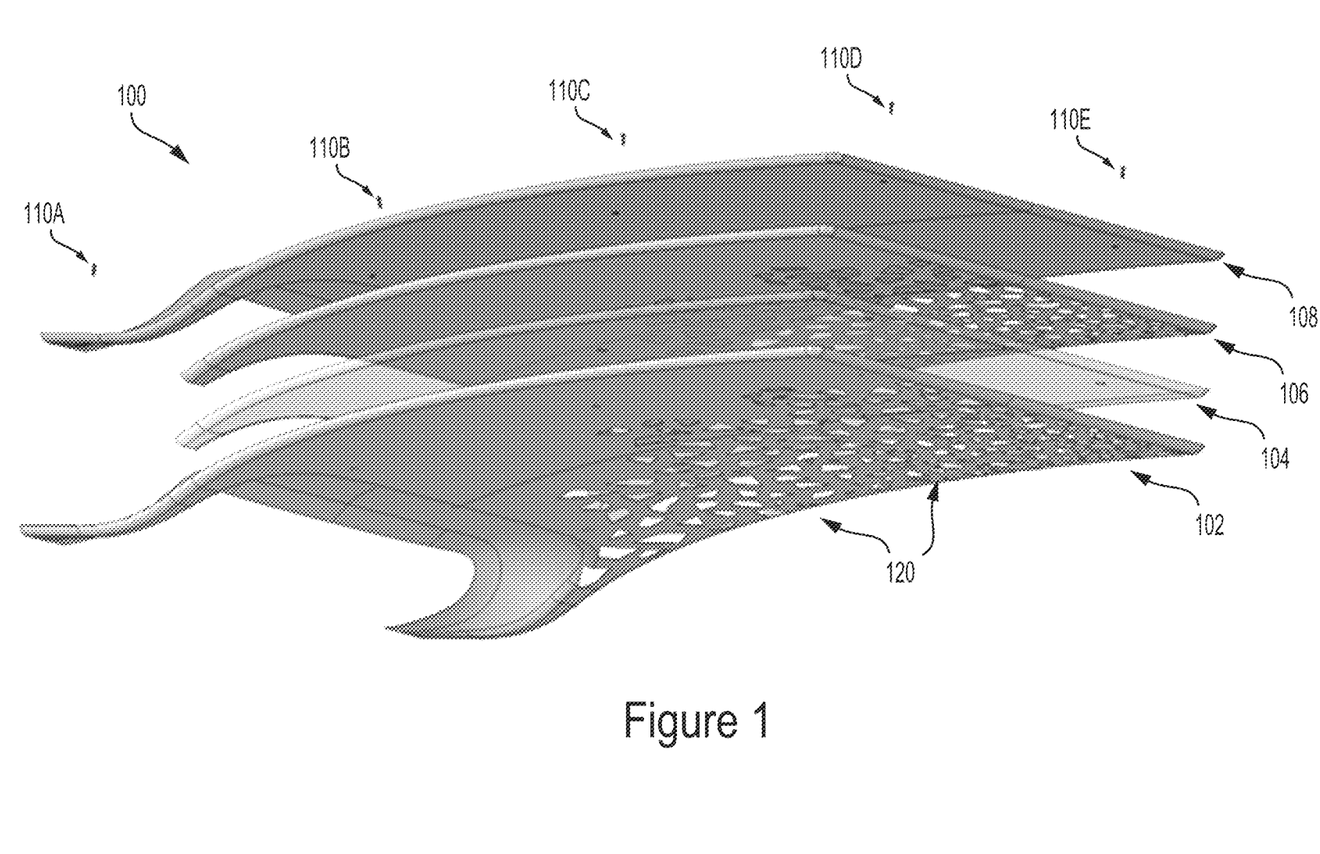
FIG. 1 illustrates a display panel, according to an example implementation.

Referring now to the Figures, FIG. 1 illustrates display panel 100 to represent an example configuration for a display panel interface. In the example implementation, display panel 100 includes display shell 102, translucent layer 104, lighting interface 106, and interior panel 108. These components are shown coupled together via fasteners 110. Other example implementations of display panel 100 can include more or fewer components in other arrangements. In addition, the decoration associated with display panel 100 can differ in other implementations. Additional configurations are described below.

Display panel 100 can be used to enhance the interior of a variety of structures and vehicles. For instance, display panel 100 can be used to modify the appearance of an interior panel within an aircraft. The aircraft can use various versions of display panel 100 to enhance the aircraft interior cabin for passengers with different decorative features implemented across interior panels, doors, stowage bins, and/or the ceiling.

Display shell 102 represents an exterior component of display panel 100 configured to enhance or generally modify an appearance of interior panel 108. In the example embodiment shown in FIG. 1, display shell 102 includes openings 120 arranged to form a decorative design. In other examples, display shell 102 may not include any openings and/or other visual effects, such as different shapes or layers crafted as part of display shell 102. As such, the decorative design can differ in example implementations. For instance, in other examples, display shell 102 can incorporate the logo of a company, such as the logo of the airline that owns the aircraft equipped with interior panel 108.

In some examples, display shell 102 is part of a larger decorative feature (e.g., a mural) that extends across multiple interior panels. For example, each interior panel in a group of interior panels can have display panel interfaces that together produce the larger decorative feature (e.g., a mural). The larger design can include designs placed on other portions of the aircraft, vehicle, or other type of structure. For example, display panel 100 can be part of a design that incorporates features placed on other portions of the aircraft, such as the ceiling or inner sides.

The generation, material or materials used, and configuration of display shell 102 can differ within examples. The appearance of display shell 102 can depend on the material(s) used, the size, shape, color, and design of display panel 100. In some examples, display shell 102 is generated using a material or materials that depend on the particular vehicle that the display shell is being installed within. For instance, a lighter weight material (e.g., plastic, composite, resin, or the like) might be used for display shell 102 when interior panel 108 is implemented within an aircraft. Similarly, materials within display panel 100 may be configured to pass specific tests associated with aircrafts (e.g., heat and fire release requirements).

Display shell 102 can be generated in a material (e.g., plastic) using an injection molding process in some examples. As indicated above, the injection molding process is a manufacturing process for producing parts by injecting molten material into a mold. The injection molding process can be used to give curvature to a panel that matches the curvature of display shell 102. Other processes may be used to generate display shell 102. For example, a 3D additive manufacturing process can be used to generate display shell 102.

The generation process can involve a water jetting process to shape details into the plastic (or other type of material) making up display shell 102. The water jetting process can remove portions of the original mold to create openings in display shell 102 as well as shape the molded panel into the desired design for display shell 102. Other generation processes can be used. For example, display shell 102 can be designed and shaped using 3D printing techniques.

Translucent layer 104 represents a component that can be included within display panel 100 to contribute to the appearance of openings 120 located within display shell 102. In some examples, translucent layer 104 is a translucent plastic film or a thermoformed plastic sheet. Translucent layer 104 can also provide additional support to display panel 100. As such, display panel 100 may exclude translucent layer 104 in some examples.

In some examples, display panel 100 can include lighting interface 106, which represents a lighting feature that can provide illumination to enhance the visibility and appearance of display shell 102. In some instances, lighting interface 106 can be positioned to provide ambient lighting for display panel 100, which can serve as a background illumination that enhances the appearance of display shell 102. Lighting interface 106 can also illuminate gaps and openings (e.g., openings 120) in display panel 100.

The type and configuration of lighting interface 106 can vary within examples. In some examples, lighting interface 106 consists of one or more light emitting diodes (LEDs). For example, lighting interface 106 can include one or more strips of LEDs that extend across translucent layer 104. The strip of LEDs can illuminate in different colors, patterns, and brightness, among other features. As such, lighting interface 106 can illuminate portions of display panel 100 different colors. In addition, lighting interface 106 can be configured to use a low amount of power to conserve power for the vehicle or for other reasons. In addition, the position of lighting interface 106 can vary within examples and can differ depending on the configuration of other components within display panel 100.

Lighting interface 106 can be connected to receive power from a power source (not shown in FIG. 1). For example, lighting interface 106 can receive power from a power source in the vehicle and/or a battery source. Lighting interface 106 can provide illumination in different colors. As such, lighting interface 106 can provide illumination in the colors specific for a design, logo, etc. For example, lighting interface 106 could provide illumination in the colors of the airline that owns the aircraft equipped with display panel 100. In addition, lighting interface 106 could illuminate different portions of display shell 102 using different colors. The colors can be programmed such that lighting interface 106 alternates between different colors in a pattern.

Additionally, lighting interface 106 can provide illumination in different patterns, which can be programmed in advance and/or controlled in near real-time by a computing device (not shown). For example, lighting interface 106 can slowly grow brighter and dim in a pattern. Lighting interface 106 could also adjust illumination based on an operation or operations of the vehicle. For example, lighting interface 106 can adjust operation during different periods of a flight. Lighting interface 106 could change colors or brightness during take-off, landing, or mid-flight. In some examples, lighting interface 106 could switch off or change color based on the portion of the day. In further examples, the operation of lighting interface 106 can be controlled by a user, such as a pilot of the aircraft or the driver of the bus. The computing device used to control lighting interface 106 can be part of the vehicle, an application on a computing device, and/or a specialized device.

Fasteners 110A, 110B, 110C, 110D, and 110E represent mechanical structures (e.g., screws) that can be used to couple components of display panel 100 together. Fasteners 110A-110E can be various types of fasteners. In the example shown, fasteners 110A-110E can extend through holes in translucent layer 104 and lighting interface 106 and into panel nuts located on a backside surface of display shell 102. Other examples can include other types of fasteners, including combinations of different types of fasteners. Further, other examples can involve using other materials (e.g., glue and/or other types of adhesives) capable of components together. The quantity of fasteners 110A-110E can depend on the size, shape, layout relative to display shell 102, and configuration of display panel 100. The fasteners may be of a certain size and/or shape to allow for specifically desired spacing between layers of the decorative panels. In examples, the layers are spaced apart a certain distance. In some examples, display panel 100 may include more or fewer layers as shown in FIG. 1. For instance, translucent layer 104 and/or lighting interface 106 may not be included in another embodiment of display panel 100.

Figure 2:
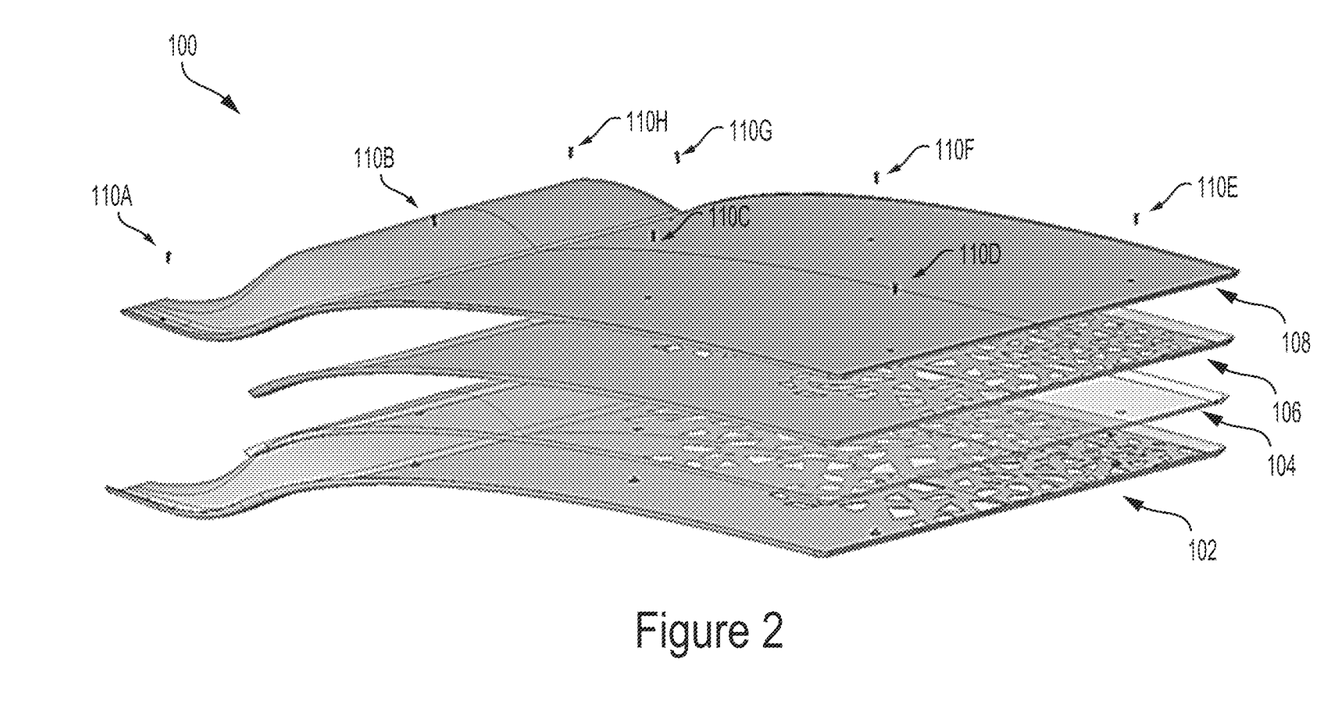
FIG. 2 illustrates another view of the display panel according to an example implementation.

FIG. 2 illustrates another view of display panel 100. In the example embodiment, display panel 100 is shown in an exploded view with display shell 102, translucent layer 104, lighting interface 106, and interior panel 108. In addition, fasteners 110A-110E are shown along with fastener 110F, 110G, 110H not previously shown in FIG. 1. The quantity, placement, size, and other parameters of fasteners 110A-110H can vary within example embodiments. As shown, the through holes in interior panel 108, lighting interface 106, and translucent layer 104 can be lined up via a fastener that connects these layers to display shell 102. FIG. 2 shows an example wherein the panels are curved.

Figure 3:
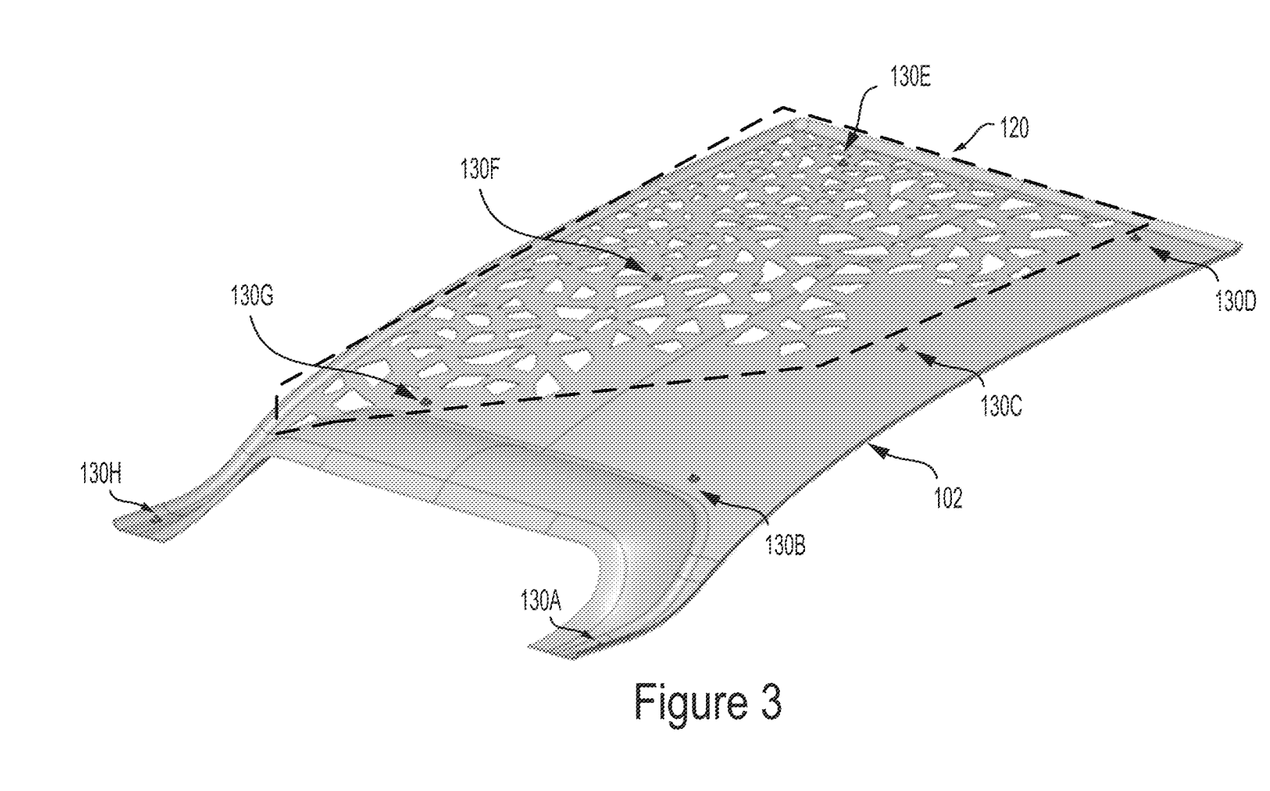
FIG. 3 illustrates a display shell from the display panel, according to an example implementation.

FIG. 3 illustrates display shell 102 from display panel 100 shown in FIG. 1 and FIG. 2. As shown in FIG. 3, display shell 102 includes openings 120 arranged to form a decorative design. In addition, panel nuts 130A, 130B, 130C, 130D, 130E, 130F, 130G, 130H are shown positioned on a surface of display shell 102, which enables other layers of display panel 100 to be coupled to display shell 102. Panel nuts 130A-130H can couple with a fastener from fasteners 110A-110H to secure display shell 102, translucent layer 104, lighting interface 106, and interior panel 108 together to form display panel 100.

Display shell 102 is further shown with a curvature and a surface area that aligns with the curvature and surface area of interior panel 108. As an example result, display shell 102 can be coupled to interior panel 108, which enables display panel 100 to be coupled back into the aircraft (or other type of vehicle) without impacting the alignment of interior panel 108 relative to other nearby panels.

Figure 4A:
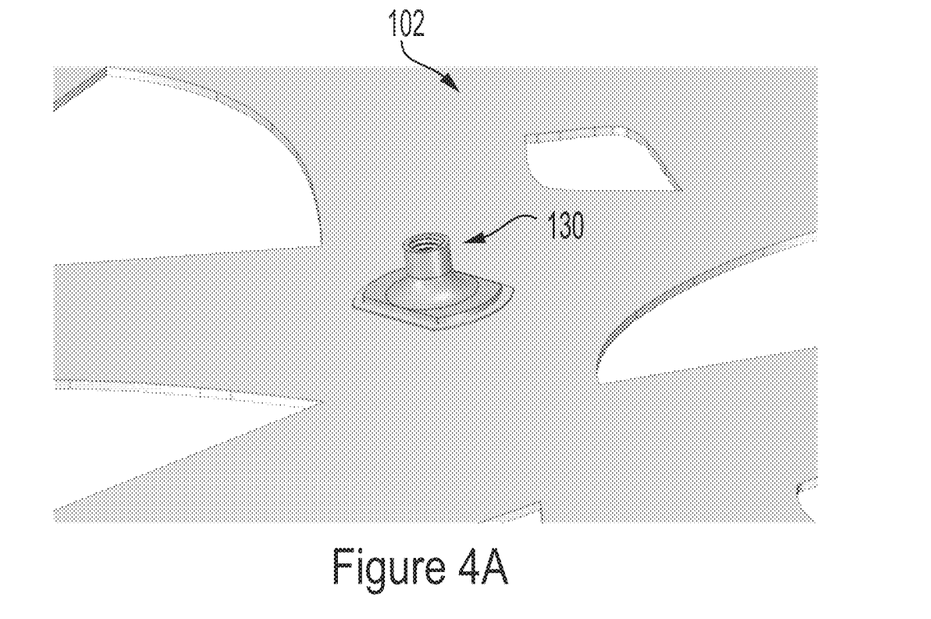
FIG. 4A illustrates a panel nut on the display shell, according to an example implementation.

FIG. 4A illustrates a panel nut, according to an example implementation. Panel nut 130 can be included on a surface of display shell 102 that couples to other components within display panel 100. Panel nut 130 may correspond to any of panel nuts 130A-130H shown in FIG. 3.

Figure 4B:
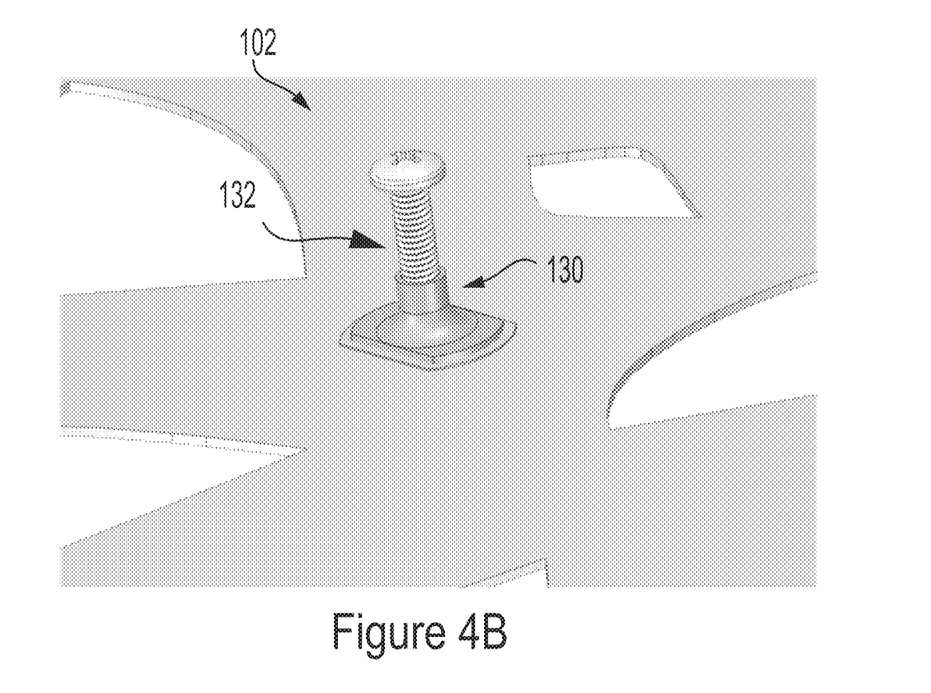
FIG. 4B illustrates a screw extending into the panel nut on the display shell, according to an example implementation.

FIG. 4B illustrates a screw extending into the panel nut, according to an example implementation. Screw 132 can be coupled through layers to align and connect display shell 102 and interior panel 108 together via the combination of screw 132 and panel nut 130. In some examples, one or both of translucent layer 104 and lighting interface 106 can be connected via screw 132 and panel nut 130 positioned on the back surface of display shell 102.

Figure 4C:
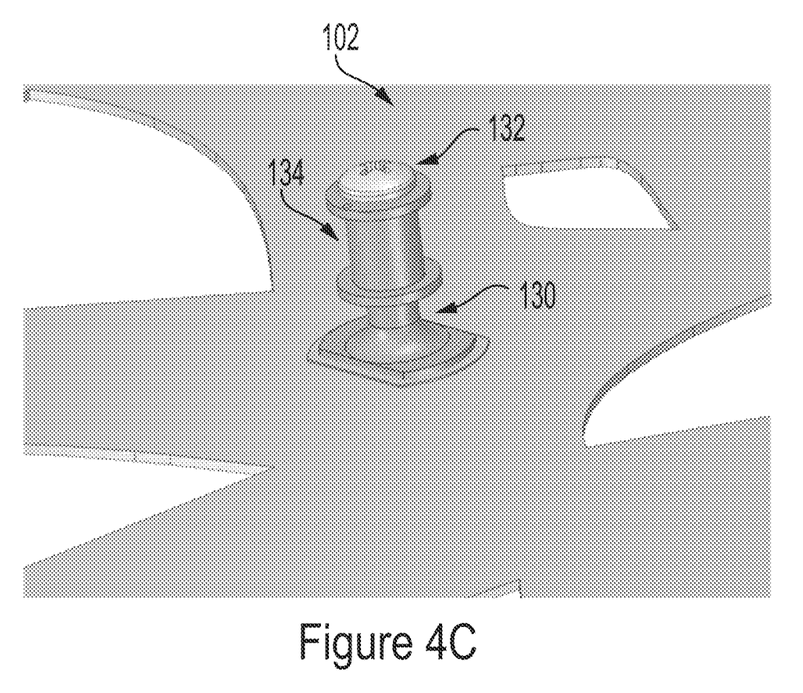
FIG. 4C illustrates another type of screw extending into the panel nut on the display shell, according to an example implementation.

FIG. 4C illustrates another type of fastener that can be used to couple together components within display panel 100. Insert 134 is another potential fastener component that can be used to couple (or partially couple) together components within display panel 100. In some cases, insert 134 can be used within display panel 100 to create a gap between layers (e.g., display shell 102 and interior panel 108 and can provide additional structural support for screw 132. Such examples show the ability to provide specific spacing between panel layers.

Figure 5:
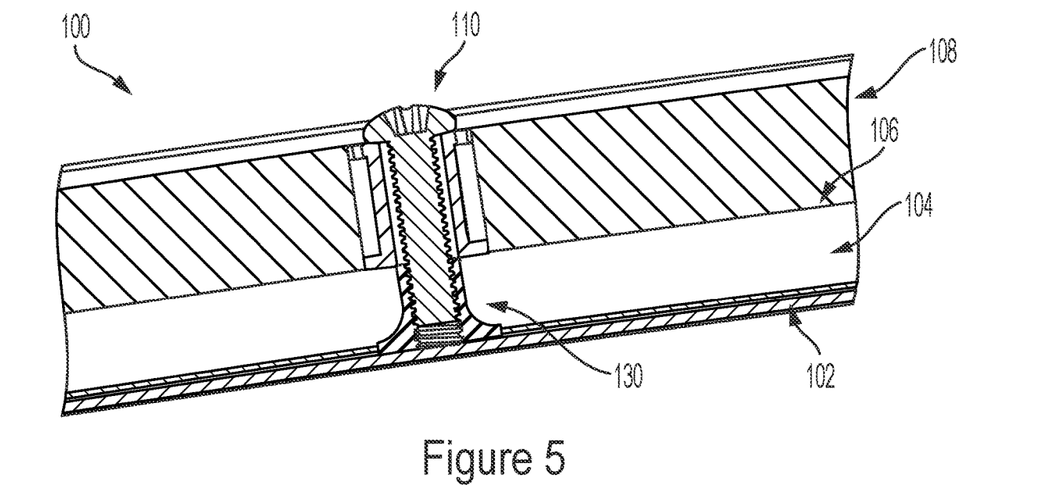
FIG. 5 illustrates a side view of a fastener coupling together components of a display panel, according to an example implementation.

FIG. 5 illustrates a side view of a fastener coupling together a display panel, according to an example implementation. Fastener 110 corresponds to a screw in this example embodiment, but can differ within other examples. As shown, in some example configurations, display shell 102, translucent layer 104, lighting interface 106, and interior panel 108 can be coupled together via fastener 110 to form display panel 100. Coupling together the layers may produce gaps in some portions of display panel 100 in some examples to add visual 3D effects.

Figure 6:
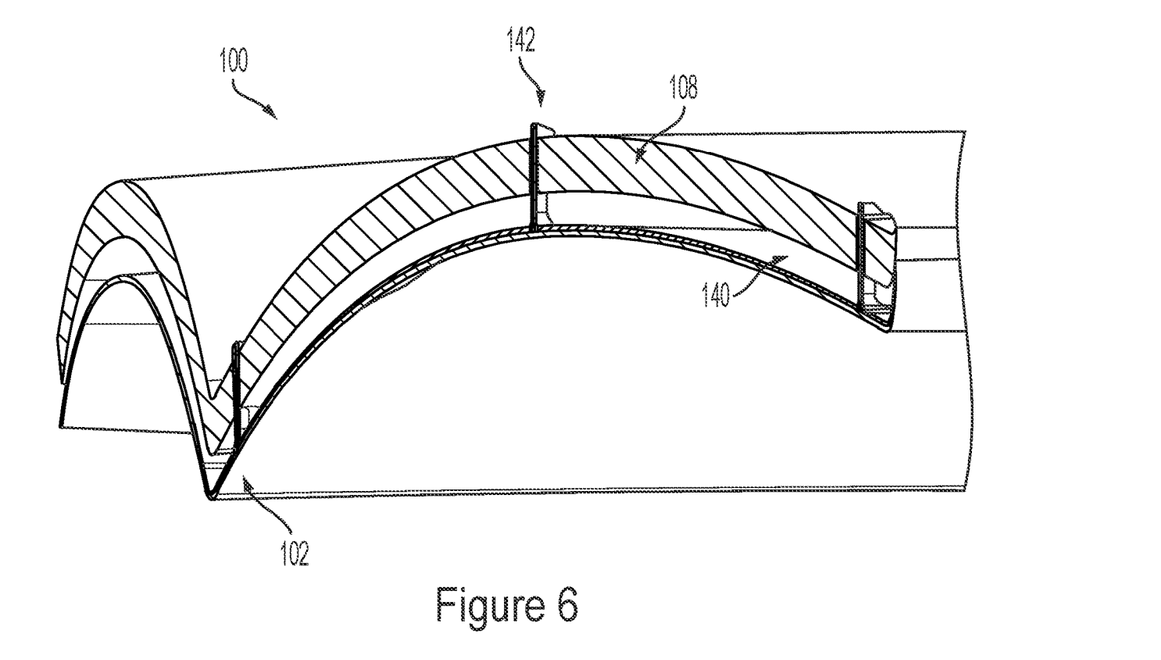
FIG. 6 illustrates a side view of a display panel, according to an example implementation.

FIG. 6 illustrates a cross section view of display shell 102 connected to interior panel 108 with gap 140 in between. Spacers 142 can be used to create and support gap 140 when display panel and interior panel 108 are coupled together. As shown, multiple fasteners can be used to couple different portions of display panel 100 together.

Figure 7:
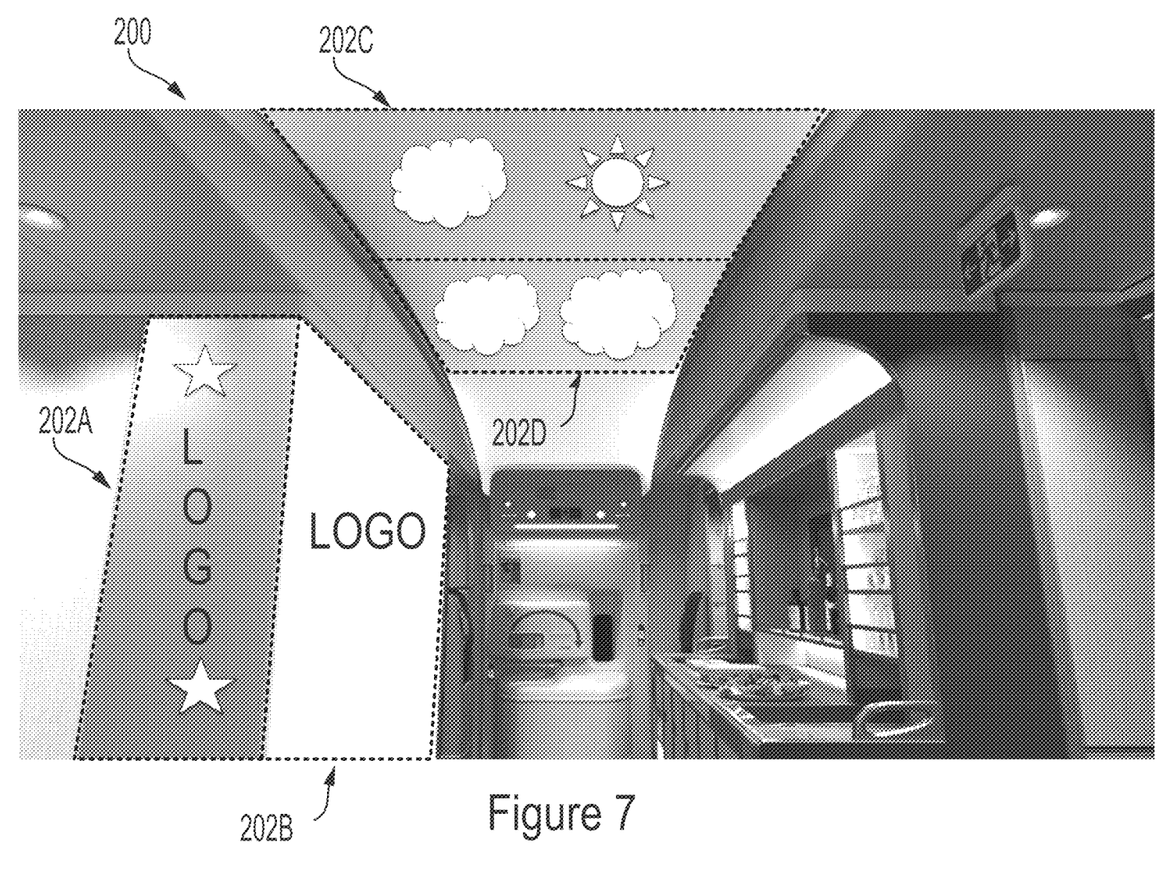
FIG. 7 illustrates a display panel system positioned in an aircraft, according to an example implementation.

FIG. 7 illustrates display panel system 200 positioned inside an aircraft. Display panel system 200 represents multiple display panels 202A, 202B, 202C, 202D arranged to form a larger visual mural that spans across different interior panels within the aircraft. As shown, display panel system 200 includes display panels 202A-202D positioned on the ceiling and walls of the aircraft to illustrate some example positions. As such, display panel system 200 may further extend to incorporate other interior portions of the aircraft not shown in FIG. 7.

Display panel 202A represents a LOGO aligned vertically between two stars and display panel 202B includes a LOGO. As shown, display panels 202A-202B may modify the appearance of wall interior panels and may be part of display panel system 200. Display panel 202C shows a cloud and a sun while display panel 202D shows two clouds. In the example embodiment, display panels 202C-202D are installed as ceiling panels of the aircraft. In other examples, display panel system 200 may include other designs and may include more or fewer display panels overall.

Figure 8:
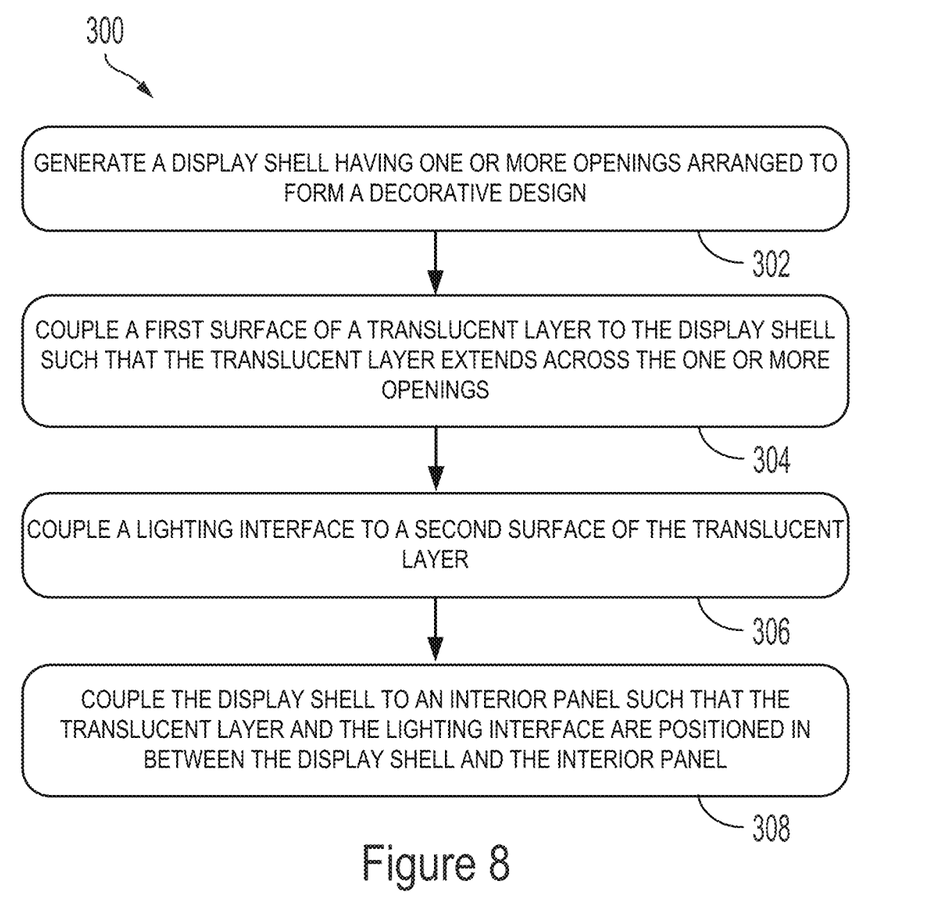
FIG. 8 shows a flowchart of a method, according to an example implementation.

FIG. 8 shows a flowchart of a method, according to an example implementation. Method 300 shown in FIG. 8 presents an example of a method that could be used to generate display panel 100 shown in FIGS. 1-6 and/or display panel system 200 shown in FIG. 7. In other examples, components of the devices and/or systems may be arranged to be adapted to, capable of, or suited for performing the functions, such as when operated in a specific manner.

Method 300 may include one or more operations, functions, or actions as illustrated by one or more of blocks 302, 304, 306, and 308. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

At block 302, method 300 involves generating a display shell having one or more openings arranged to form a decorative design. Different techniques can be used to generate the display shell and the decoration design of the display shell. In addition, various types of materials can be used to generate the display shell. For instance, the display shell can include laminated glass, plastics, aluminum, and/or other types of materials.

In some examples, the display shell is generated to have a surface area that is equal to or less than a surface area of the interior panel. As an example result, the display shell can be coupled to the interior panel and not extend beyond the surface area of the interior panel. In turn, the display shell can be positioned on door interior panels, stowage bin panels, and other panels that open and close relative to a hinge or multiple hinges without impacting the movement range of the panels. Similarly, the display shell can also be generated to include a curvature that matches a curvature of the interior panel. For instance, a display shell configured to enhance the appearance of a stowage bin may include a curvature that aligns with the curved panel exterior of the stowage bin, which can allow the display shell to be coupled to the panel exterior without impacting the stowage bin's ability to open and close.

At block 304, method 300 involves coupling a first surface of a translucent layer to the display shell such that the translucent layer extends across the one or more openings. In some examples, the translucent layer is a translucent plastic film. In other examples, the translucent layer is a thermoformed plastic sheet.

At block 306, method 300 involves coupling a light interface to a second surface of the translucent layer. In some examples, the lighting interface is configured to illuminate one or more portions of the translucent layer positioned relative to the one or more openings in the display shell. The lighting interface may illuminate the one or more portions of the translucent layer using power from a power source located on an aircraft.

The configuration of the lighting interface can differ within example implementations. In some examples, the lighting interface includes one or more printed circuits where each printed circuit includes multiple lights attached to printed terminal locations. In addition, the lighting interface may include multiple light emitting diodes (LEDs) coupled to one or more strips in some examples. The lighting interface can be configured to provide illumination in one or more colors and/or one or more patterns based on an operation status of the aircraft. For instance, a computing device can be configured to provide illumination instructions to one or more lighting interfaces associated with one or more display panels.

At block 308, method 300 involves coupling the display shell to an interior panel such that the translucent layer and the lighting interface are positioned in between the display shell and the interior panel. In some examples, the display shell is coupled to the interior panel via a set of fasteners.

For instance, the set of fasteners can include one or more panel nuts positioned on a backside of the display shell and one or more screws that couple the interior panel to the backside of the display shell.

In some examples, the display shell is coupled to the interior panel such that specific spacing or gap is formed between the display panel and the interior panel. As an example result, the lighting interface can be configured to provide ambient illumination in the gap formed between the display panel and the interior panel. The size of the gap can vary within example embodiments. For instance, the gap can be 1-10 millimeters (mm) or 1-5 centimeters (cm) or greater than 5 cm. The gap between the display shell and the interior panel can cause the display shell to have three-dimensional (3D) visual effects. In addition, the display shell can include raised portions and/or curvature that further emphasizes the 3D visual effects.

In some examples, the interior panel is configured to couple to an interior of an aircraft. For instance, the interior panel may correspond to an interior door located in the aircraft. In other instances, the interior panel may correspond to an inner ceiling panel in the aircraft. In other embodiments, the interior panel may be used in the dome in the entry way of the aircraft. In some applications, the lighting interface can be controlled by a computing device, which can provide control instructions to adjust the colors, pattern, brightness, and other operations performed by the lighting interface.

In some examples, the display panel is a first display that is part of a display system. The display system may be a mural or another type of display that incorporates multiple displays together as part of a theme or another decoration. For instance, multiple display panels can form portions of an overall mural that extends across different interior portions of an aircraft (e.g., stowage bins, doors, window panels, ceiling, and/or floor).

By the term "substantially" or "about" used herein, it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may describe different advantages as compared to other advantageous examples. The example or examples selected are chosen and described in order to best explain the principles of the examples, the practical application, and to enable others of ordinary skill in the art to understand the disclosure for various examples with various modifications as are suited to the particular use contemplated.

What is claimed is:

1. A display panel for decorating an interior of an aircraft, the display panel comprising:
   a display shell having one or more openings arranged to form a decorative design, wherein a surface area of the display shell is shaped to match a surface area of an interior panel of the aircraft;
   a translucent layer, wherein a first surface of the translucent layer is coupled to the display shell, and wherein the translucent layer extends across the one or more openings;
   a lighting interface coupled to a second surface of the translucent layer, wherein the lighting interface is configured to illuminate one or more portions of the translucent layer positioned relative to the one or more openings in the display shell; and
   the interior panel of the aircraft, wherein the display shell is coupled to the interior panel of the aircraft such that the translucent layer and the light interface are positioned in between the display shell and the interior panel of the aircraft.

2. The display panel of claim 1, wherein a curvature of the display shell matches a curvature of the interior panel.

3. The display panel of claim 1, wherein the display shell comprises laminated glass or aluminum.

4. The display panel of claim 1, wherein the display shell is coupled to the interior panel such that a gap is formed between the display panel and the interior panel, and
   wherein the lighting interface is further configured to provide ambient illumination in the gap formed between the display panel and the interior panel.

5. The display panel of claim 4, wherein the display shell is coupled to the interior panel via a set of fasteners, and
   wherein the set of fasteners includes one or more panel nuts positioned on a backside of the display shell and one or more screws that couple the interior panel to the backside of the display shell.

6. The display panel of claim 1, wherein the translucent layer comprises a translucent plastic film or a thermoformed plastic sheet.

7. The display panel of claim 1, wherein the lighting interface includes one or more printed circuit comprising a plurality of lights attached to printed terminal locations.

8. The display panel of claim 1, wherein the lighting interface includes a plurality of light emitting diodes (LEDs) coupled to one or more strips.

9. The display panel of claim 1, wherein the interior panel corresponds to an interior door or an inner ceiling panel located in the aircraft.

10. The display panel of claim 1, wherein the interior panel corresponds to an inner ceiling panel in the aircraft.

11. The display panel of claim 1, wherein the lighting interface is configured to illuminate the one or more portions of the translucent layer using power from a power source located on an aircraft.

12. The display panel of claim 1, wherein the interior panel of the aircraft is a moving interior panel.

13. The display panel of claim 1, wherein the display shell includes one more shapes formed to produce a three dimensional (3D) design.

14. A system for decorating an interior of an aircraft, the system comprising:
    a first display panel comprising:
       a first display shell having one or more openings arranged to form a first portion of a decorative design, wherein a surface area of the display shell is shaped to match a surface area of an interior panel of the aircraft;
       a translucent layer, wherein a first surface of the translucent layer is coupled to the first display shell, and wherein the translucent layer extends across the one or more openings;

a lighting interface coupled to a second surface of the translucent layer, wherein the lighting interface is configured to illuminate one or more portions of the translucent layer positioned relative to the one or more openings in the first display shell; and the interior panel of the aircraft, wherein the first display shell is coupled to the interior panel of the aircraft such that the translucent layer and the light interface are positioned in between the first display shell and the interior panel of the aircraft; and a second display panel positioned proximate the first display panel.

15. The system of claim 14, wherein the second display panel comprises:

a second display shell having one or more openings arranged to form a second portion of the decorative design.

16. The system of claim 14, wherein the lighting interface is a first lighting interface, and wherein the second display panel further comprises:

a second lighting interface coupled the lighting interface of the first display panel.

17. The system of claim 16, further comprising:

a computing device configured to provide illumination instructions to the first lighting interface and the second lighting interface.

18. The system of claim 14, wherein the lighting interface is configured provide illumination in one or more colors and/or one or more patterns based on an operation status of the aircraft.

19. A method for decorating an interior of an aircraft, the method comprising:

generating a display shell having one or more openings arranged to form a decorative design, wherein a surface area of the display shell is shaped to match a surface area of an interior panel of the aircraft;

coupling a first surface of a translucent layer to the display shell such that the translucent layer extends across the one or more openings;

coupling a lighting interface to a second surface of the translucent layer, wherein the lighting interface is configured to illuminate one or more portions of the translucent layer positioned relative to the one or more openings in the display shell; and coupling the display shell to the interior panel of the aircraft such that the translucent layer and the lighting interface are positioned in between the display shell and the interior panel of the aircraft.

20. The system of claim 14, wherein the interior panel of the aircraft is a moving interior panel.

* * * * *